United States Patent [19]

Hill

[11] 3,753,132

[45] Aug. 14, 1973

[54] SAMPLE-AND-HOLD CIRCUIT

[75] Inventor: Eugene R. Hill, Thousand Oaks, Calif.

[73] Assignee: The United States of America as represented by the Secretary of the Navy

[22] Filed: Mar. 2, 1972

[21] Appl. No.: 231,310

[52] U.S. Cl. .............. 328/151, 307/235 R, 307/246, 307/251

[51] Int. Cl..... H03k 5/18, H03k 17/04, H03k 17/08

[58] Field of Search .................... 307/235 R, 235 A, 307/246, 251, 229, 230; 328/150, 151

[56] References Cited

UNITED STATES PATENTS

| | | | |
|---|---|---|---|
| 3,430,072 | 2/1969 | Stevens | 328/151 X |
| 2,924,709 | 2/1960 | Morrill | 328/147 |
| 3,474,259 | 10/1969 | Rodgers | 307/235 X |
| 3,555,298 | 1/1971 | Neelands | 307/235 |
| 3,413,491 | 11/1968 | Reeves | 307/235 A |
| 3,304,507 | 2/1967 | Weekes et al. | 328/151 |
| 3,363,113 | 1/1968 | Bedingfield | 307/238 |
| 3,328,705 | 6/1967 | Eubanks | 307/235 A X |
| 3,259,760 | 7/1966 | Morey et al. | 307/235 A |
| 3,479,534 | 11/1969 | Miller | 307/235 X |
| 3,482,174 | 12/1969 | James | 307/240 X |
| 3,543,169 | 11/1970 | Hill | 328/151 |
| 3,553,492 | 1/1971 | Bugay | 307/235 |
| 3,586,880 | 6/1971 | Fitzwater, Jr. | 328/151 X |
| 3,588,531 | 6/1971 | Bjor | 307/235 X |
| 3,564,287 | 2/1971 | Todd | 307/235 |
| 3,602,825 | 8/1971 | Senior | 307/235 R X |
| 3,686,577 | 8/1972 | Fruhauf | 307/235 R X |

OTHER PUBLICATIONS

Kennedy, "Variable Threshold Control," IBM Tech. Discl. Bull. Vol. 8, No. 4, p. 692–693, 9/1965.

Bjorkman, "Peak Picking & Noise Suppression Circuitry," IBM Tech. Discl. Bull.; Vol. 9, No. 6, p. 588–589, 11/1966.

Hansen, "Burst Mode Sampling Amplifier," IBM Tech. Discl. Bull., Vol. 14, No. 7, p. 2196–2197, 12/1971.

Hearn, "Applications for Fast Slewing OP Amps," Electronic Products Magazine, p. 54–55, 6/21/1971.

Bosswetter, "Sample-Hold Circuit is Inexpensive & Stable," Electronic Design, p. 94, 7/4/1968.

*Primary Examiner*—John W. Huckert
*Assistant Examiner*—L. N. Anagnos
*Attorney*—Richard S. Sciascia et al.

[57] ABSTRACT

A sample-and-hold circuit which comprises a first input amplifier, a switch connecting a second amplifier to the output of the first amplifier and a pair of diodes which prevents saturation of the first amplifier during the hold period by closing a negative feedback path around the first amplifier when the signal level exceeds the diode conduction voltage.

5 Claims, 3 Drawing Figures

SAMPLE-AND-HOLD CIRCUIT

BACKGROUND OF THE INVENTION

This invention relates to sample-and-hold circuits and more particularly to a system for taking an accurate instantaneous sample of an input signal and holding this value as a fixed output voltage until the next sample is taken. An important object is to maintain isolation between the signal source and the output load.

Sample-and-hold circuits have a wide range of application in the field of electronics. Examples are analog-to-digital converters, zero order interpolation in sampled data systems, gated AGC circuits, etc. PAM and PCM telemetry systems are sampled data systems, as is the pulse orthogonal multiplexing (POM) type telemetry system which in some respects is superior to the other telemetry systems. Sample-and-hold circuits are used in all sampled data systems. The sample-and-hold circuit of this invention is uniquely suited to the multiplexer portion of the POM type telemetry system.

Many different approaches and configurations have been used to achieve the sample-and-hold function. These prior approaches all suffer from one or more disadvantages. They do not present a high constant resistive load to the signal source at all times, or they do not guarantee adequate protection of the signal source in the event of circuit failure. Also they may require more than one switch and may require two closely aligned coincident sample pulses rather than just one sample pulse. These prior approaches, also, may not provide a low output impedance, especially as an integral part of the sample-and-hold circuit, and the output may exponentially approach final value during sample time, as contrasted with the faster response of a second order system.

SUMMARY OF THE INVENTION

The sample-and-hold circuit of this invention comprises a first input amplifier, a switch, with a parallel capacitor input, connecting a second amplifier to the output of the first amplifier, a feedback path between the two amplifiers, and a pair of oppositely poled diodes connected between the feedback path and the output of the first amplifier. The switch is closed during the sample period and the capacitor is charged; in the hold period the switch is opened and the sampled voltage is held on the capacitor until needed. The diode pair prevents saturation of the first amplifier during the hold period by closing a negative feedback path around the first amplifier when the signal level exceeds the diode conduction voltage.

The present circuit was designed to sample sensitive operational circuits and transducers in a remote test vehicle. Two of the prime requirments of such sample-and-hold circuits are: that it presents a high and constant resistive load to the signal source at all times, and that in the event of failure of the sample-and-hold circuit an appreciable resistive isolation be provided between the signal source and the active components comprising the sample-and-hold circuit.

This invention embodies essentially all the desirable features for a sample-and-hold system in one relatively simple circuit. In the present circuit, a high constant resistance load with a ground potential reference is presented to the signal source at all times, and the signal source is protected by preventing abnormal loading thereof in the event of circuit failure. A low output impedance is presented to the load at all times, both during hold and sample periods. The circuit has the high speed of response that is associated with a second order system, permits optimum adjustment of the damping factor, and has the high precision associated with operational amplifiers. Only one SPST switch is required in the present system and this system can be implemented with integrated circuits. Further, this circuit prevents saturation of the input amplifier during the hold period, and has means to adjust for optimum transient response to minimize time to final value. The circuit provides precision sampling of the input voltage with the sample time short relative to the sample period, and negligible decay in voltage during maximum hold time.

Other objects, advantages and novel features of the invention will become apparent from the following detailed description of the invention when considered in conjunction with the accompanying drawings wherein.

DESCRIPTION OF THE PREFERRED EMBODIMENTS

Figure 1:
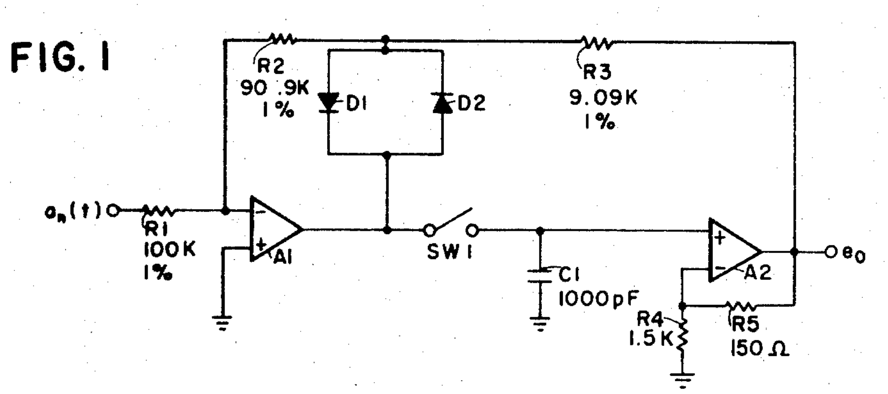
FIG. 1 is a simple schematic drawing of the circuit of the present invention.
Figure 2:
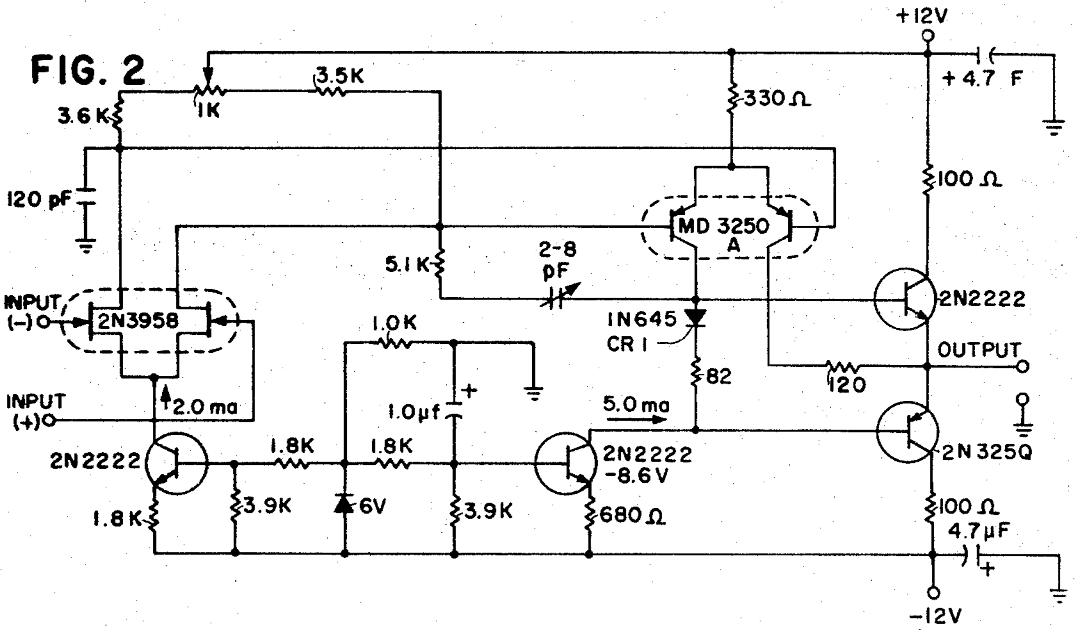
FIG. 2 is a schematic diagram of an input operational amplifier which can be used for the sample-and-hold circuit of FIG. 1.

The schematic diagram of FIG. 1 shows two operational amplifiers; however, only the input amplifier A1 requires the precision characteristics normally associated with an operational amplifier. A schematic diagram of a suitable amplifier for input amplifier A1 is shown in FIG. 2. The output amplifier A2 operates as a non-inverting amplifier with a gain of (R4 + R5)/R4. The important requirements of output amplifier A2 are a high input impedance and a low output impedance; high load current capability is not required. The requirements of output amplifier A2 are satisfied by means of a simple field effect transistor (FET) compound circuit as shown in the output section of the detailed schematic diagram of FIG. 3. The values associated with the circuit components in each of the figures are given merely by way of example.

A sample of the input signal is taken by closing the sampling switch SW1 for a time which is short relative to the rate of change of the input data. At the end of the sample pulse, and after transients have subsided, the output voltage $e_o$ is given by the formula:

$$e_o = -[R2 + R3/R1]\, a_n$$

where $a_n$ represents the value of the input voltage $a_n(t)$ at the end of the sampling interval. Because the resistors are selected for unity gain, the output voltage $e_o$ at the end of the sampling time is $-a_n$.

Examination of the circuit shown in FIG. 1 shows that the foregoing statements will be true only if no current flows in diodes D1 and D2 during sampling. This current will be negligible provided that the voltage across the diodes is less than the junction barrier potential. For silicon diodes, this potential is several tenths of a volt, except at extremely high temperatures. The condition for zero voltage across the diodes is given by the following equation:

$$R3/R2 = R5/R4$$

During the sampling interval, capacitor C1 is charged to the appropriate voltage to bring the output voltage to $-a_n$. When the switch SW1 opens, this charge on capacitor C1 will be maintained because of the high input impedance of the output amplifier; hence the output voltage $e_o$ will remain at $-a_n$.

Diodes D1 and D2 serve two functions. First, they prevent the input operational amplifier A1 from being saturated during the hold period. Otherwise this would occur, since amplifier A1 would then be operating with open-loop gain, and between sample pulses small changes in the input voltage $a_n(t)$ would overdrive A1. Diodes D1 and D2 prevent this because they close the feedback path through resistor R2 as soon as the output from amplifier A1 changes sufficiently to cause diode conduction. (Saturation of A1 would be undesirable since the recovery time would reduce the speed of response.) With switch SW1 open, resistor R3 is no longer in the feedback path and represents only a small additional load on each amplifier.

The second function of diodes D1 and D2 is that of maintaining the input summing junction at virtual ground. Thus the input data source is presented with a constant resistive load to ground. Series resistor R1 provides the added advantage of isolating the data source, or input source, from the active components of the sample-and-hold circuit. This prevents possible shorting or serious loading of the data source if failure occurs in the sample-and-hold circuit. The input load resistance is, therefore, at all times referenced to a fixed voltage, i.e., virtual ground. The use of diodes D1 and D2 in conjunction with resistors R2, R3, R4 and R5 to prevent saturation of amplifier A1 during the hold period is an important feature of this circuit.

Proper operation of the sample-and-hold circuit shown in FIG. 1 depends upon proper operation of switch SW1. A schematic of switch SW1 and an account of its operation is hereinafter given in FIG. 3 and the discussion thereof.

Figure 3:
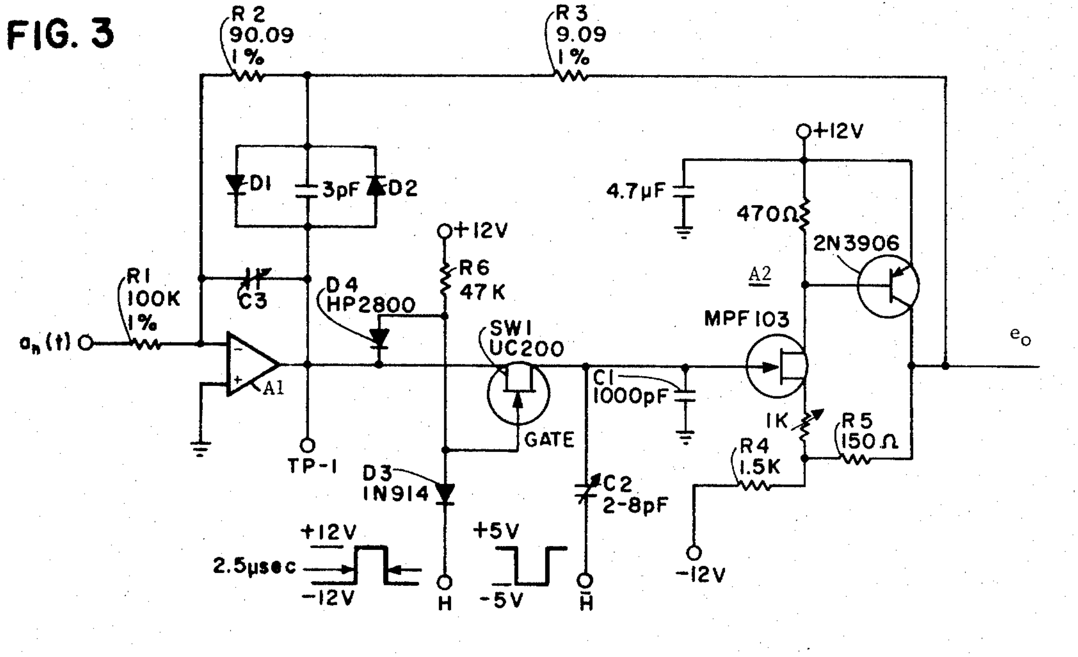
FIG. 3 is a detailed schematic diagram of a preferred embodiment of the sample-and-hold circuit of FIG. 1.

The diagram of FIG. 2 illustrates an FET operational amplifier of the type which is used for input amplifier A1 for the sample-and-hold circuit shown in FIGS. 1 and 3.

FIG. 3 is a detailed schematic diagram of the multiplexer sample-and-hold circuit of FIG. 1 also showing components of the sampling switch SW1. The functions and required characteristics of the components of switch SW1 which include an N-channel FET (UC-200) plus associated components; diodes D3 and D4, resistor R6, and capacitor C2 are also described in copenidng U.S. Pat. application, Ser. No. 231,314, filed Mar. 2, 1972, for "High Frequency Field Effect Transistor Switch." During the negative state of sampling pulse H, which is obtained from a one-shot multivibrator for example, sampling switch SW1 is open, and during the positive state of sampling pulse H, switch SW1 is closed. When the sampling pulse H is in its negative state, current flows through diode D3 and resistor R6. For fast closing of sampling switch SW1, the minority storage charge in diode D3 must be sufficient to discharge the gate-to-channel capacitance of the FET of SW1 and the capacitance of diode D4. When switch SW1 is opened, this gate-to-channel capacitance is recharged. The necessary charge is taken from holding capacitor C1, thus altering its final voltage. The function of capacitor C2 is to resupply this charge and prevent change in the final voltage on capacitor C1. This is done by applying to capacitor C2 a pulse $\bar{H}$ which is opposite in polarity to H (obtained from the same one-shot multivibrator as H). By proper adjustment of capacitor C2, this error can be completely compensated.

The function of diode D4 is to prevent saturation of the FET gate-to-channel junction when sampling switch SW1 is closed. This reduces the tansients associated with opening of the switch by preventing minority carrier stored charge accumulation. This in turn reduces the required magnitude of capacitor C2, thus making this a less critical adjustment. The required characteristics of diode D4 are low junction capacitance, low stored charge, and high conductance. The hot carrier diode HP 2800 serves well here for diode D4.

In order for the transients at output $e_o$ to decay to a sufficiently low value at the end of the sample period, a suitable damping factor is necessary. The trim capacitor C3 permits adjustments of the damping factor.

Obviously many modifications and variations of the present invention are possible in the light of the above teachings. It is therefore to be understood that within the scope of the appended claims the invention may be practiced otherwise than as specifically described.

What is claimed is:

1. A sample-and-hold system for taking an accurate, instantaneous sample of an input signal and hold this value as a fixed output voltage until the next sample is taken, comprising:

a. an input operational amplifier connected to an input signal source;

b. an output operational amplifier;

c. a sample switch means connecting the output of said input amplifier to the input of said output amplifier;

d. capacitor means in parallel with said sample switch means also connected to the input of said output amplifier;

e. a feedback path between the output of said output amplifier and the input to said input amplifier;

f. a pair of oppositely poled diodes connected between said feedback path and the output of said input amplifier;

g. said switch means being closed during the sample period of operation of the system charging said capacitor means with the sampled voltage, said switch means being opened during the hold period and the sampled voltage being held on said capacitor means until needed, providing precision sampling of the input voltage with the sample time short relative to the sample period, and negligible decay in voltage during maximum hold time;

h. said diode pair preventing saturation of said input amplifier during the hold period by closing a negative feedback path around the input amplifier when the signal level exceeds diode conduction voltage;

i. resistive means provided for isolating the input signal source from active components of the sample-and-hold system, the system presenting a high and constant resistive load to the protecting signal source at all times, prtecting the signal source by preventing abnormal loading thereof in the event of circuit failure; and J. said system presents a low output impedance to the load at all times, during both sample and hold periods.

2. A system as in claim 1 wherein said sampling switch means is a field effect transistor switch circuit.

3. A system as in claim 1 wherein said output operational amplifier has a high input impedance and a low output impedance.

4. A system as in claim 1 wherein said output operational amplifier is a simple field effect transistor compound circuit.

5. A system as in claim 1 wherein to diode pair maintains the input ot said input operational amplifier at virtual ground for presenting the input signal source with a constant resistive load to ground.

* * * * *